United States Patent [19]
Figley

[11] Patent Number: 5,086,730
[45] Date of Patent: Feb. 11, 1992

[54] BIRD FEEDER

[76] Inventor: Robert S. Figley, B-2 C.C. Village, Lake Wales, Fla. 33853

[21] Appl. No.: 620,751

[22] Filed: Dec. 3, 1990

[51] Int. Cl.⁵ .................................... A01K 31/00
[52] U.S. Cl. ............................ 119/52.3; 119/51.01; 119/57.9
[58] Field of Search ............... 119/52.1, 52.2, 52.3, 119/57.8, 57.9, 51.01

[56] References Cited
U.S. PATENT DOCUMENTS

| 2,987,041 | 6/1961 | Bard | 119/52.3 |
| 3,316,884 | 5/1967 | Viggars | 119/52.3 |
| 3,730,139 | 5/1973 | Moore | 119/52.2 X |
| 4,144,842 | 3/1979 | Schlising | 119/52.3 |
| 4,389,975 | 6/1983 | Fisher, Jr. | 119/52.3 |

FOREIGN PATENT DOCUMENTS

| 100350 | 11/1940 | Switzerland | 119/52.1 |
| 948716 | 2/1964 | United Kingdom | 119/52.2 |

Primary Examiner—Paul J. Hirsch
Assistant Examiner—R. Thomas Price
Attorney, Agent, or Firm—Duckworth, Allen, Dyer & Doppelt

[57] ABSTRACT

A bird feeder for preventing rodents from grabbing bird seed in the bird feeder. The feeder includes a silo having a first end and a second end with an opening to permit seed to flow onto a supporting tray below the silo. A conically shaped cover is attached adjacent the silo. The cover extends outward in a substantially straight line from a narrow portion which is connected to the top of the silo to a wide portion. The straight line terminates the cover in the wide portion. The diameter of the perimeter of the wide portion, has a ratio selected with respect to the diameter of the perimeter of the feeder tray, to prevent rodents from accessing the feeder.

9 Claims, 1 Drawing Sheet

BIRD FEEDER

BACKGROUND OF THE INVENTION

This invention relates to bird feeders for foiling squirrels and other rodents. It has been a problem to provide bird feeders which are not disturbed by squirrels. Squirrels and other predators are constantly endeavoring to climb upon the bird feeder and not only drive away the birds, but also feed on the seed and scatter seed with consequent loss.

One method of protecting the dish from squirrels is disclosed in U.S. Pat. No. 4,030,451 and U.S. Pat. No. 4,102,308. These feeders are constructed by having a semi-cylindrical hood connected to a dish that is mounted below. The hood covers a feed dish to protect the seed from the rain and from rodents. Drawbacks to this dish is that it does not hold a large quantity of seed, consequently the seed dish requires constant replenishment. Further, when the squirrel attempts to land on these feeders, or when the wind blows, the feeder swings to the side, which may result in spillage of the seed.

Other feeders that provide protection against theft of bird seed are disclosed in U.S. Pat. Nos. 3,590,780, 3,482,549 and 4,821,681. These patents disclose springs and tubular guards to prevent access by rodents. These devices complicate the manufacturing of these feeders. Thus, these feeders have parts that can break down thereby requiring repair and maintenance.

Another feeder used to present squirrels from accessing seed is disclosed in U.S. Pat. No. 3,977,363. This feeder has a detachable roof with a steep pitch and with lower eaves having a gentle pitch. The roof pitch dumps the squirrel when it climbs on the roof. A drawback to this feeder is that when the squirrel attempts to access the seed the bird feeder may swing and tip, resulting in seed being spilled. In cold weather conditions, ice may become trapped between the gentle pitch and the steeper pitch of the roof resulting in the roof cracking. Another drawback to this device is that it does not provide for 360° perching by the birds. This feeder only provides a limited number of perches connected to the bottom of the housing. This bird feeder also uses ropes and strings to hold the roof to the feeder. These ropes may wear out in time, thereby requiring replacement. The perimeter of the feeder tray in this device is close to the outer edge of the cover. Consequently, when the feeder swings the squirrels may be able to jump onto the feeder and access the feed tray.

SUMMARY OF THE INVENTION

An object of this invention is to provide an improved bird feeder that is able to withstand attack by squirrels, rodents and other pests.

Another object of this invention is to cover the bird feeder with a roof that is less susceptible to cracking in varying weather conditions.

It is further an object of this invention to cover a bird feeder with a roof that is less susceptible to swinging when disturbed by squirrels or when the feeder is blown in the wind.

An additional object of this invention is to allow birds to perch in a 360° circle around the feeder.

It is another object of this invention to shape the roof of the bird feeder to prevent the rodents from remaining on the roof when they endeavor to climb upon the feeder.

An object of this invention is to entirely construct a bird feeder without moving parts that wear out.

It is also an object of this invention to allow seed to be stored in the bird feeder without requiring constant replenishment.

Also an object of this invention is to support the roof with a baffle to prevent cover deformation when the feeder is disturbed by rodents.

These and other objects are provided with a bird feeder for foiling rodents comprising a silo having a front end and a second end with an opening to permit seeds to flow therethrough, means for supporting the feeder, and means disposed adjacent the silo second end and having an outside diameter for holding seeds after flowing through the opening. The feeder further includes a conically shaped cover attached adjacent the silo first end, the cover having a narrow portion and a wide portion, the cover extends away from the narrow portion in a substantially straight line toward the wide portion so as to terminate the cover and the wide portion. Terminating the cover in this manner prevents squirrels from resting on or tipping the bird feeder. The wide portion has a diameter greater than the outside diameter of the holding means, preferably by a 2:1 ratio or more, to prevent squirrels from bypassing the cover to access the bird seed. It may be preferable that the bird feeder holding means include a side wall surrounding the silo that extends upward parallel to the silo. The side wall will thereby allow birds to perch while preventing seed from spilling. It may also be preferable that the side wall extend around the silo in a 360° circle to allow more birds to perch on the feeder at any angle relevant to silo.

DESCRIPTION OF THE PREFERRED EMBODIMENTS

Figure 1:
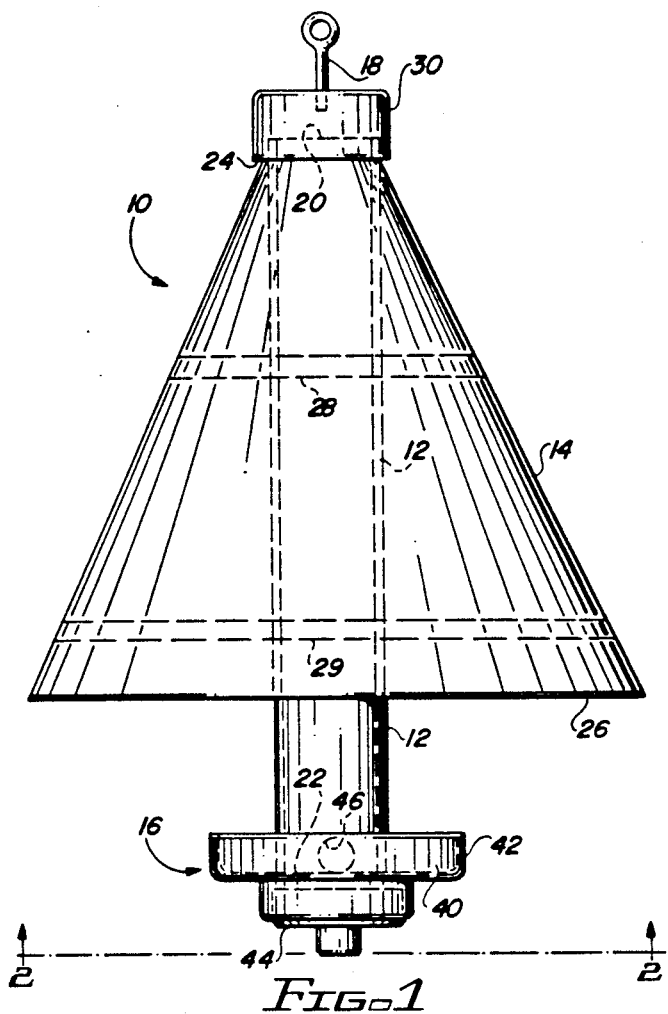
FIG. 1 is a side view of the bird feeder.
Figure 2:
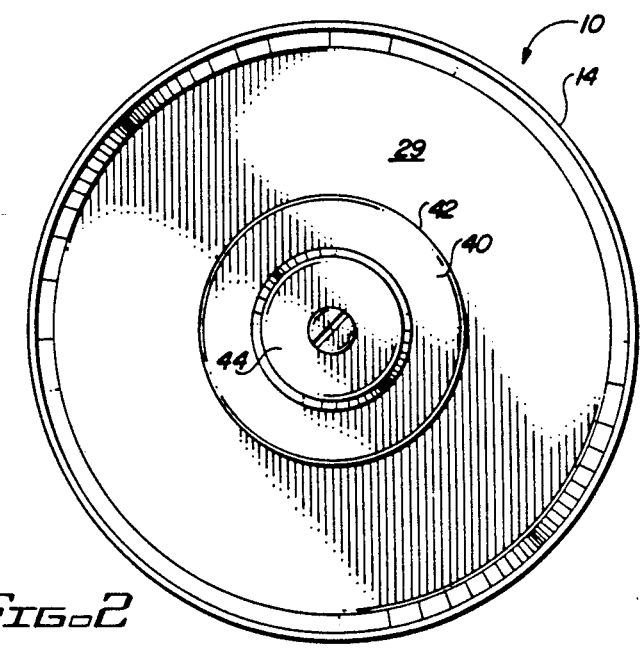
FIG. 2 is a bottom view of the bird feeder shown in FIG. 1 along the lines 2—2.

Referring to FIGS. 1 and 2 there is shown a bird feeder 10 having a silo 12 connected to cover 14, means for holding the feed 16, and hanger 18.

Silo 12 is preferably cylindrically shaped having a first end 20 and a second end 22. The silo 12 is adapted to hold feed including bird seed or the like.

Cover 14 is preferably conically shaped having a narrow end 24 attached to first end 20 of silo 12. Cover 14 extends from narrow end 24 outward along silo 12 in the direction of second end 22. Cover 14 terminates at wide end 26 having an outside diameter greater than the outside diameter of feeder means 16 and silo 12. This outside diameter of wide end 26 is at least two times greater than the outside diameter of feed holding means 16. This 2:1 ratio of the diameter of the feed holding means 16 perimeter to the diameter of wide end 26 perimeter prevents squirrels from grasping onto feed holding means 16. This ratio is critical to prevent the squirrels from accessing feeder means 16 if feeder 10 is swinging in the wind.

Cover 14 also includes baffles 28 and 29 that are connected to, and encircle, silo 12 to hold cover 14 in place. Baffles 28 and 29 provide additional support for cover 14 to prevent it from deforming when cover 14 is disturbed by squirrels. Coupled on first end 20 and narrow end 24 of silo 12 is cap 30. Cap 30 is preferably attached to silo 12 and cover 14 by adhesive.

Figure 3:
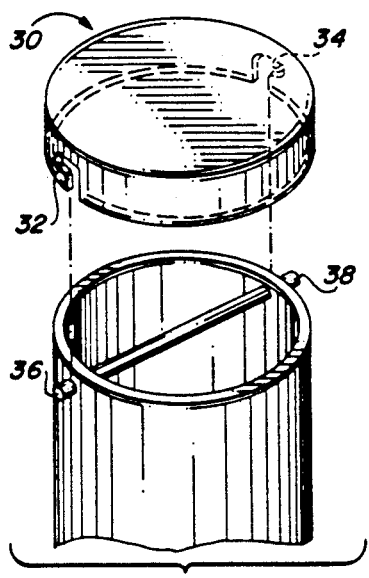
FIG. 3 is an alternate embodiment of the top portion of the bird feeder in FIG. 1 having a removable cover for adding seed to the bird feeder.

Referring to FIG. 3, alternately cap 30 may include indentations 32 and 34 on its inner surface. Further, pins 36 and 38 may be attached to the outer surface of silo 12 and are adapted to mate with indentations 32 and 34. The indentations 32 and 34 are positioned to permit cap 30 to be turned and removed from silo 12 to replenish seed. Referring to FIGS. 1 and 3, hanger 18 is connected to cap 30. Hanger 18 is adapted to be hung from a tree, pole or other device with an eye bolt or wire.

Referring to FIGS. 1 and 2, feeder means 16 includes a feeder tray 40 fixedly attached to second end 22 of silo 12. Feeder tray 40 includes wall 42 that is disposed around the perimeter of feeder tray 40 and extending normal to feeder tray 40. Screwed into the bottom of feeder tray 40 is plug 44. Plug 44 may be removed from feeder means 16 to deposit more seed into bird feeder 10.

Disposed adjacent the second end 22 of silo 12 is opening 46 in which bird feed flows there through onto feeder tray 40. It is preferable that the length of wall 42 extend above opening 46 to prevent bird seed from spilling in the event of minor tipping of cover 14. Wall 42 both contains the bird seed within the feeder tray 40 and provides a perch extending in a 360° circle around silo 12.

It is preferable that feeder means 16 be located close to wide end 26 to provide protection from rodents and to operate as a rain cover for the birds. Preferably the minimum distance between the top of wall 42 and the bottom of cover 24 is about one-third of the distance between the bottom of cover 24 and the top of cover 24. It has been recognized by the inventor that squirrels tend to jump in an arc shape. Accordingly, maintaining approximately a 3:1 ratio of the height of cover 14 to the distance between wall 42 and bottom of the cover 24 prevents squirrels from accessing seed on tray 40.

The preferred dimensions of feeder 10 are as follows; however, these dimensions are not intended to be the only feeder dimensions. The minimum distance between wall 42 and wide end 26 is 3.5 inches. The outside diameter of cover 14 is sixteen inches and the outside diameter of wall 42 is 6.5 inches. The length along the outside of cover 14 from its narrow end 24 to its wide end 26 is selected to be longer than the body of a squirrel around fifteen inches. This length is necessary to prevent the squirrel from bypassing cover 14 and directly accessing seed on feeder tray 40.

This concludes the description of the preferred embodiments. A reading by those skilled in the art will bring to mind various changes without departing from the spirit and scope of the invention. It is intended, however, that the invention only be limited by the following appended claims.

What is claimed is:

1. A bird feeder for foiling rodents comprising:
   a silo having a front end and a second end with an opening to permit seed to flow there through;
   means for supporting said feeder;
   means disposed adjacent said silo second end and having an outside diameter for holding seed after flowing through said opening;
   a conically shaped cover attached adjacent said silo first end, said cover having a narrow portion and a wide portion, said cover extending away from said narrow portion in a substantially straight line toward said wide portion, said substantially straight line terminating said cover in said wide portion, said wide portion having a diameter greater than the outside diameter of said housing means, said diameter of the outside perimeter of the wide portion having a ratio with respect to the diameter of the outside perimeter of the holding means of about 2:1 or more; and
   means for preventing the cover from deforming when the feeder is disturbed by a rodent, said preventing means having a plurality of baffles extending perpendicularly away from said silo and connecting to said cover, said baffles being disposed at predetermined intervals along said silo.

2. The bird feeder as recited in claim 1 wherein said holding means includes a side wall surrounding said silo extending upward parallel to said silo to allow birds to perch while preventing seed from spilling.

3. The bird feeder as recited in claim 2 wherein said wall extends 360° around said silo.

4. The bird feeder as recited in claim 2 wherein said opening includes an aperture within said silo that has a diameter less than the height of the side wall.

5. The bird feeder as recited in claim 1 further comprising a plug inserted into said holding means and being adapted to be removed from said holding means to permit feed to be filled in said silo.

6. The bird feeder as recited in claim 1 wherein the length of said cover from said narrow end to said wide end is at least 14 inches to prevent the squirrel from grabbing said cover termination.

7. The bird feeder as recited in claim 1 wherein said holding means is attached to said silo.

8. A bird feeder for preventing rodents from grabbing bird feed in the feeder, the feeder comprising:
   a substantially cylindrically shaped silo having a first end and a second end with an opening to permit bird feed to flow through;
   a hanger coupled to said silo first end;
   a support tray coupled to said second end and having a side wall for containing bird feed flow through said silo opening, said side wall having an outer diameter;
   a conically shaped cover having a narrow end and a wide end, said narrow end being attached to said silo adjacent said first end, said cover extending along said silo outwardly away from said silo and terminating in said wide end, said cover wide end having an outer diameter greater than the outer diameter of said side wall to prevent rodents from grabbing the bird feed; and
   a plug screwably coupled through an aperture in said support tray to said silo such that the plug may be screwably removed to add feed to the silo.

9. The bird feeder as recited in claim 8 wherein said cover extends along said silo in a substantially straight line and terminates said cover in a wide end.

* * * * *